United States Patent [19]

Kawano et al.

[11] Patent Number: 5,026,222
[45] Date of Patent: Jun. 25, 1991

[54] PIN FOR USE IN A WORKPIECE CLAMPING APPARATUS

[75] Inventors: Satoshi Kawano, Tamamura; Yoshio Kimura, Maebashi; Eiji Fukushima, Fujimi, all of Japan

[73] Assignee: Sanden Corporation, Japan

[21] Appl. No.: 490,385

[22] Filed: Mar. 8, 1990

Related U.S. Application Data

[62] Division of Ser. No. 316,099, Feb. 28, 1989, Pat. No. 4,930,955.

[30] Foreign Application Priority Data

Feb. 28, 1988 [JP] Japan .................................. 63-44495

[51] Int. Cl.⁵ ................................................ B23Q 3/00
[52] U.S. Cl. ........................................ 409/225; 269/54; 269/54.4; 269/156; 279/110; 409/219
[58] Field of Search ................... 279/16, 15, 66, 67, 279/93, 110, 112; 409/219, 224, 225; 269/53, 54, 54.4, 156

[56] References Cited

U.S. PATENT DOCUMENTS

| | | | |
|---|---|---|---|
| 1,349,963 | 8/1920 | Jerrim | 269/156 |
| 1,372,661 | 3/1921 | Secord | 269/156 |
| 2,524,006 | 9/1950 | Capelazzi | 279/15 |
| 2,541,605 | 2/1951 | Ohlsson | 269/156 |
| 2,955,820 | 10/1960 | Berg | 269/54 |
| 4,286,778 | 9/1981 | Follmeyer | 409/225 |
| 4,433,564 | 2/1984 | Fukushima et al. | |
| 4,436,465 | 3/1984 | Fukushima et al. | |
| 4,456,051 | 6/1984 | Hukuhara | |
| 4,487,248 | 12/1984 | Fukushima et al. | |
| 4,572,276 | 2/1986 | Hukuhara | |
| 4,930,955 | 6/1990 | Kawano et al. | 409/225 |

Primary Examiner—Daniel W. Howell
Attorney, Agent, or Firm—Banner, Birch, McKie & Beckett

[57] ABSTRACT

A pin for use in a chuck for clamping a discoid portion of a workpiece, the chuck including a base, at least to fixed clamps secured on a front end surface of the base, a movable clamp adjacent to the front end surface of the base and the pin secured to the front end surface of the base. The pin is adapted to fit in a hole formed in a discoid when the discoid is mounted on the chuck wherein the hole has a larger diameter than the pin. The pin has generally rhombic transversed section with a long diagonal and a short diagonal. The pin is truncated by a predetermined amount at each end along the long diagonal to allow the workpiece to move a limited distance relative to the pin along a line formed by the short diagonal. The limited distance may be a function of an initial clearance between the discoid portion and the chuck or a function or a variation between the diameter of the discoid portion and its design diameter, or a function of both. In the preferred embodiment, the predetermined amount truncated from each end of the pin is a function of ½ the difference between the long diagonal and the square root of the difference between the long diagonal squared and the limited distance squared.

10 Claims, 4 Drawing Sheets

PIN FOR USE IN A WORKPIECE CLAMPING APPARATUS

CROSS REFERENCE TO RELATED APPLICATIONS

This is a divisional of copending application Ser. No. 07/316,099 filed Feb. 28, 1989, now U.S. Pat. No. 4,930,955.

TECHNICAL FIELD

This invention broadly relates to an apparatus and method for clamping a work piece for machining thereof. More particularly, the present invention relates to a lathe chuck for clamping a discoid portion of a work, which is suitable for manufacturing a scroll for use in a scroll type fluid displacement apparatus, and a method for clamping the work in the chuck.

BACKGROUND OF THE INVENTION

A perspective view of a prior art chuck is shown in FIG. 1. Chuck 10, suitable for use in a lathe, includes circular base portion 11, annular projection 12, fixed clamps 13 and 14, and movable clamp 15. Annular projection 12 axially projects from a front end surface of base portion 11 to support work 20. Fixed clamps 13 and 14 are positioned radially outwardly from annular projection 12 and are fixedly secured on the front end surface of base portion 11. Movable clamp 15 comprises generally L-shaped block 151, screw 152 and clamping portion 153. L-shaped block 151 is fixedly secured to an outer peripheral surface of base portion 11. Clamping portion 153, positioned between annular projection 12 and block 151, is fixedly secured on the front end surface of base portion 11. Screw 152 passes through a threaded bore in an upper portion of block 151 to engage and move clamping portion 153 radially inwardly. More specifically, rotation of screw 152 forces or bends an upper part of clamping portion 153 radially inwardly along dashed line 16. Dashed lines 16, 17 and 18 represent the three-dimensional X, Y and Z axes for chuck 10, respectively. Dashed line 18 passes through the radial center of base portion 11 and corresponds to the centroidal axis of annular projection 12. Radial center $O_M$ of base portion 11 is depicted in FIG. 2. Cut-out portion 121a is formed in annular projection 12 within the first quadrant defined by the X and Y axes. Pin member 19a is fixedly disposed within cut-out portion 121a. Pin member 19a is generally prismatic within generally rhombic bases so that a transverse section thereof is generally rhombic. However, only a portion of pin member 19a may be prismatic. Alternatively, pin member 19a may have rhombic transverse sections without being prismatic.

Work 20 includes discoid portion 21 and machining portion 22 fixedly secured on a front end surface of discoid portion 21. Cylindrical hole 211a is axially bored into a rear end surface of discoid portion 21 and has a diameter slightly larger than the longer diagonal distance of the rhombic base or rhombic transverse section of pin member 19a. Therefore, hole 211a may receive pin 19a. The longer diagonal distance is designated as $D_1$ in FIG. 1 and is defined by the longer diagonal line of the rhombic base or rhombic transverse section of pin member 19a.

Fixed clamps 13 and 14 and movable clamp 15 preferably are equiangularly spaced. Furthermore, each inner surface of fixed clamps 13 and 14 and clamping portion 153 is preferably arc-shaped with a radius of curvature corresponding to the radius of curvature of the outer peripheral surface of discoid portion 21.

The sequence of mounting work 20 on chuck 10 is as follows. Work 20 is placed on an end surface of annular projection 12 so that pin member 19a enters hole 211a. Once work 20 is so positioned, fixed clamps 13 and 14 and clamping portion 153 surround work 20. Then, screw 152 is turned to force clamping portion 153 radially inwardly by bending an upper portion thereof along axis 16. As a result, clamping portion 153 firmly clamps discoid portion 21 against fixed clamps 13 and 14. Referring to FIG. 2, the solid and dashed lines represent before clamping and clamped situations, respectively.

However, during the clamping step of discoid portion 21 wherein clamping portion 153 forces discoid portion 21 against fixed clamps 13 and 14, work 20 may undergo undesirable motion. More specifically, work 20 may rotate about the longitudinal axis or rhombic center point Op of pin member 19a in response to the bending force of clamping portion 153. Such undesirable angular displacement is designated by $\alpha$ in FIG. 2. In turn, such angular displacement of work 20 would shift the radial center of work 20 from $O_W$ to $O'_W$ as illustrated in FIG. 2. As a result, the radial center of work 20 may not be aligned with radial center $O_M$ of base portion 11 and chuck 10. Accordingly, accurate or precise machining of portion 22 is sacrificed. Consequently, the above described prior art chuck would not be suitable for machining parts such as scrolls used in scroll type fluid displacement of apparatus wherein dimensional precision is critical.

SUMMARY OF THE INVENTION

In view of the above and other deficiencies of the known prior art, it is an object of the present invention to provide a chuck that affords accurate centering of the work in the chuck.

It is another object of the present invention to provide a lathe chuck suitable for precision machining.

It is a further object of the present invention to provide a chuck with a clamping mechanism which prevents rotation of the work during clamping and enables alignment of the centroidal axis of the work with the rotational axis of the chuck.

Thus, the invention involves a chuck for clamping a discoid portion of a work. The chuck includes a base, at least two fixed clamps secured on a front end surface of the base, a movable clamp adjacent to the front end surface of the base and a pin secured to the front end surface of the base. The pin is adapted to fit in a hole formed in the discoid when the discoid is mounted on the chuck. Furthermore, the pin is positioned radially inwardly of the movable clamp toward the chuck center and oriented so that the at least two fixed clamps are equiangularly spaced about and equidistantly spaced from the pin. The orientation of the pin allows the discoid to move relative to the pin and toward the at least two fixed clamps, while preventing rotation of said discoid.

Other important features and advantages of the invention will be apparent from the following description and the accompanying drawings, wherein for purpose of illustration only, a specific form of the invention is shown in detail.

DETAILED DESCRIPTION OF THE PREFERRED EMBODIMENT

Figure 3:
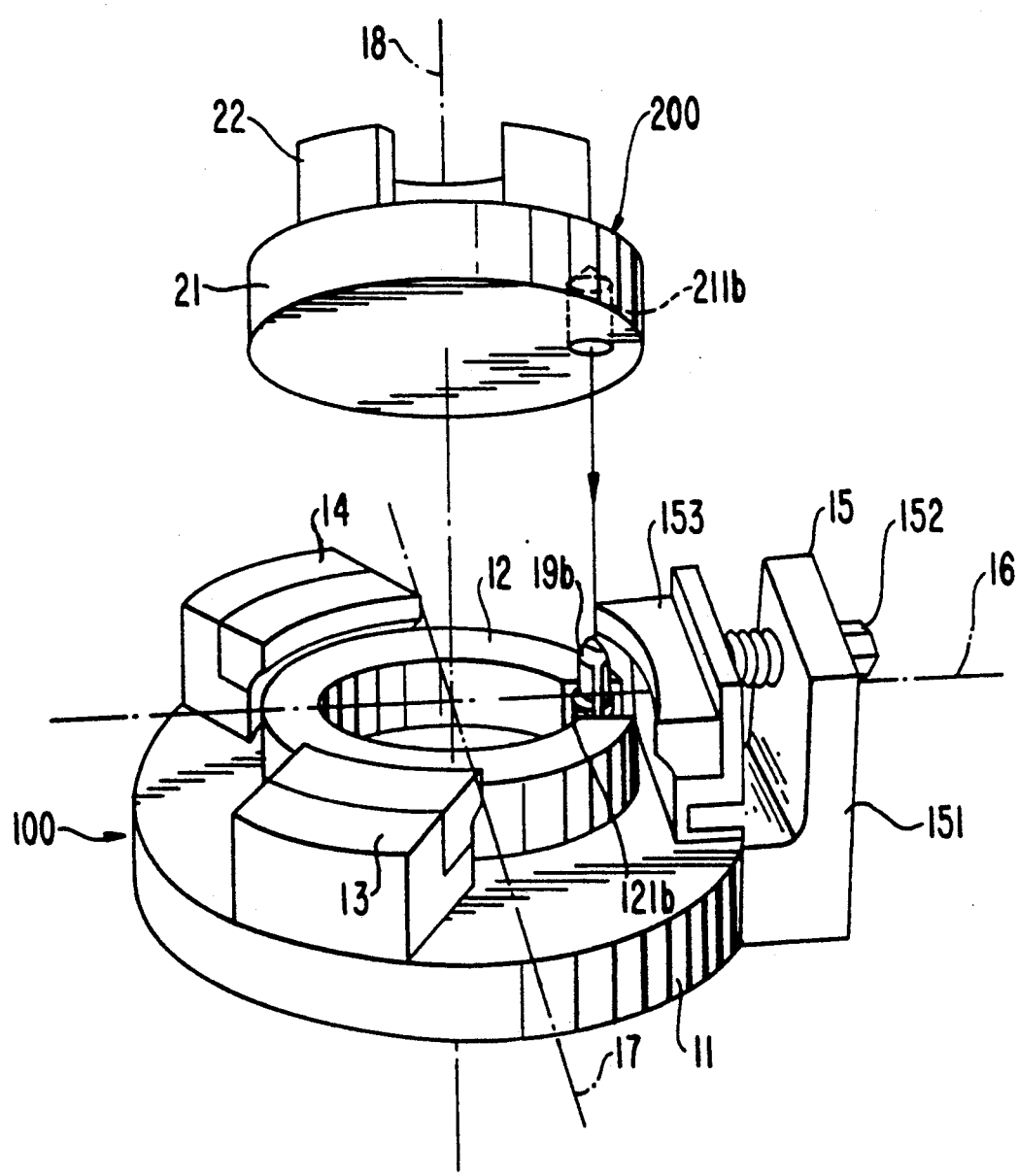
FIG. 3 is a perspective view of a chuck in accordance with a preferred embodiment of the present invention with the work shown thereabove.

Referring to the drawings in detail, wherein like numerals indicate like elements, FIG. 3 shows a chuck in accordance with a preferred embodiment of the present invention. In chuck 100, cut-out portion 121b is formed in a portion of annular projection 12 and is centered before the inner surface of clamping portion 153 so that cut-out portion 121b is aligned with line 16. Accordingly, fixed clamps 13 and 14 are equiangularly spaced about and equidistantly spaced from cut-out portion 121b. Pin member 19b is fixedly disposed within cut-out portion 121b so that fixed clamps 13 and 14 also are equiangularly spaced about and equidistantly spaced from pin 19b. Pin member 19b is generally prismatic with generally rhombic bases. Alternatively, only a portion of the pin 19b may have a generally rhombic transverse section. Furthermore, pin 19b is positioned so that shorter diagonal line $D_S$ of its rhombic base or rhombic section is parallelly aligned with line 16. Accordingly, fixed clamps 13 and 14 are equiangularly spaced about and equidistantly spaced from any point on diagonal line $D_S$. Cylindrical hole 211b is axially bored in a rear end surface of discoid portion 21. The diameter of of hole 211b is slightly larger than the length of longer diagonal line $D_1$ of the rhombic base or rhombic transverse section of pin member 19b.

Figure 4:
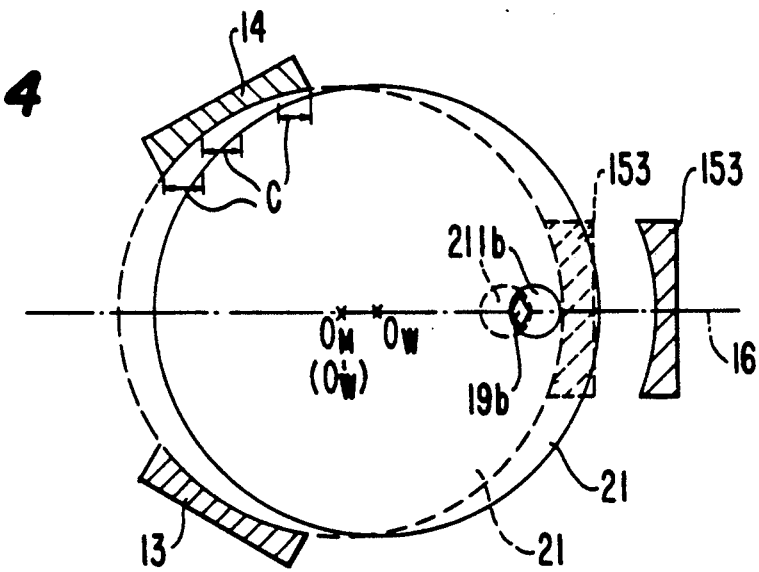
FIG. 4 is a partial plan view of the chuck of FIG. 3 diagrammatically showing the linear displacement of the work during the clamping step.

The sequence of mounting work 200 on chuck 100 is as follows. Work 200 is placed on an end surface of annular projection 12 so that pin member 19b enters hole 211b. Once work 200 is so positioned, fixed clamps 13 and 14 and clamping portion 153 surround work 200. Then, screw 152 is turned to force clamping portion 153 radially inwardly by bending an upper part thereof along axis 16. As a result, clamping portion 153 firmly clamps discoid portion 21 against fixed clamps 13 and 14. Referring to FIG. 4, the solid and dashed lines represent before clamping and clamped situations, respectively.

Figure 1:
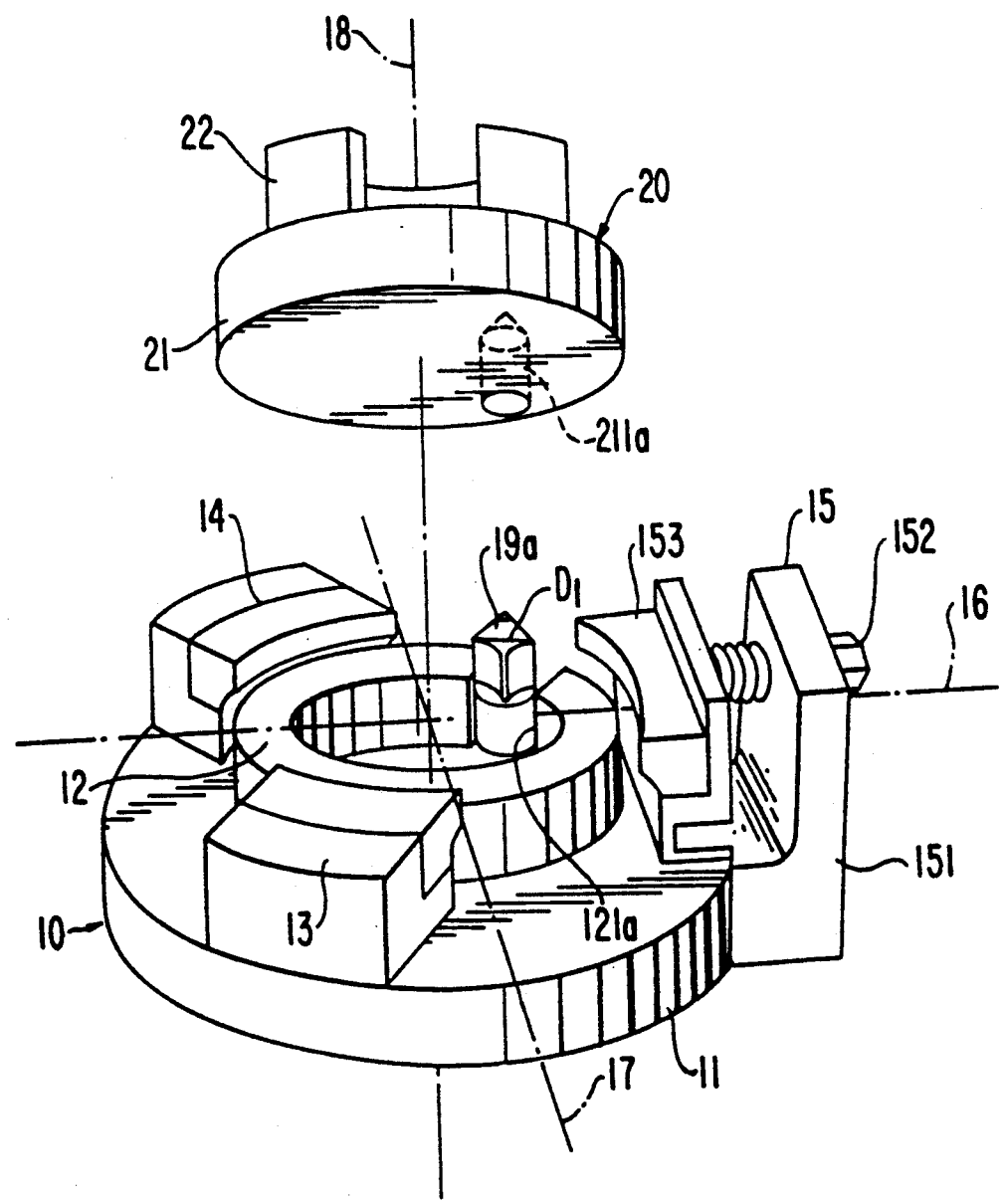
FIG. 1 is a perspective view of a chuck in accordance with the prior art with the work shown thereabove.
Figure 2:
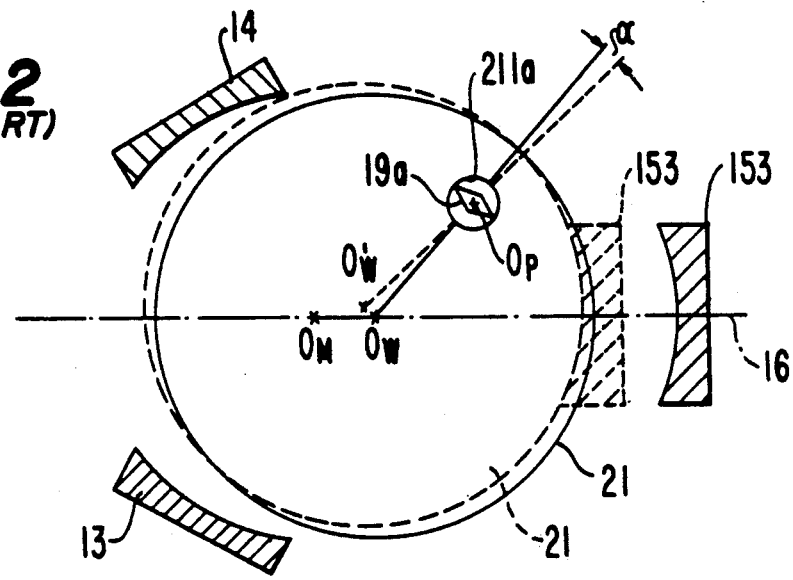
FIG. 2 is a partial plan view of the chuck and work of FIG. 1 diagrammatically showing the linear and angular displacement of the work during the clamping step.

In contrast to the prior art depicted in FIG. 2, clamping portion 153 moves work 200 and discoid 21 linearly toward fixed clamps 13 and 14, i.e., along line 16, without rotation of work 200 (see FIG. 4). As a result, the radial center of work 200 shifts from $O_W$ to $O'_W$ so that the radial center of work 200 is aligned with radial center $O_M$ of base portion 11 which forms the master center of chuck 100. Consequently, work 200 is centered in chuck 100.

Figure 5:
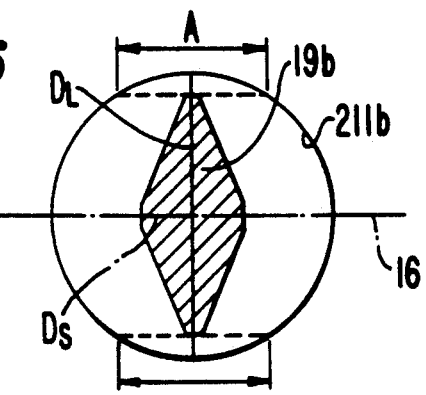
FIG. 5 is a transverse cross-sectional view of the pin member shown in FIG. 3 and its relative position to a hole formed in the work.

Referring to FIG. 5, two edges of pin member 19b are cut to shorten longer diagonal $D_L$ of the rhombic section so that work 200 may move along line 16 relative to pin 19b a distance A during the clamping step. Distance A is defined by the following relation:

A = (the predetermined initial clearance (C) between discoid portion 21 and fixed clamps 13, 14) + (one-half of the variation in discoid diameter between an ideal discoid and the actual discoid mounted in chuck 100).

An "ideal discoid" is here defined as being a discoid of exact design dimensions (i.e., an imaginary discoid built to exact design specifications without any tolerance deviation).

However, when such discoid variation, or error, is minimal, distance A may be determined without including the specific variation. Therefore, distance A is generally determined as being slightly greater than clearance C. Returning to FIG. 4, clearance C is measured along a line parallel to line 16 which is the line along which clamping portion 153 moves.

Figure 6:
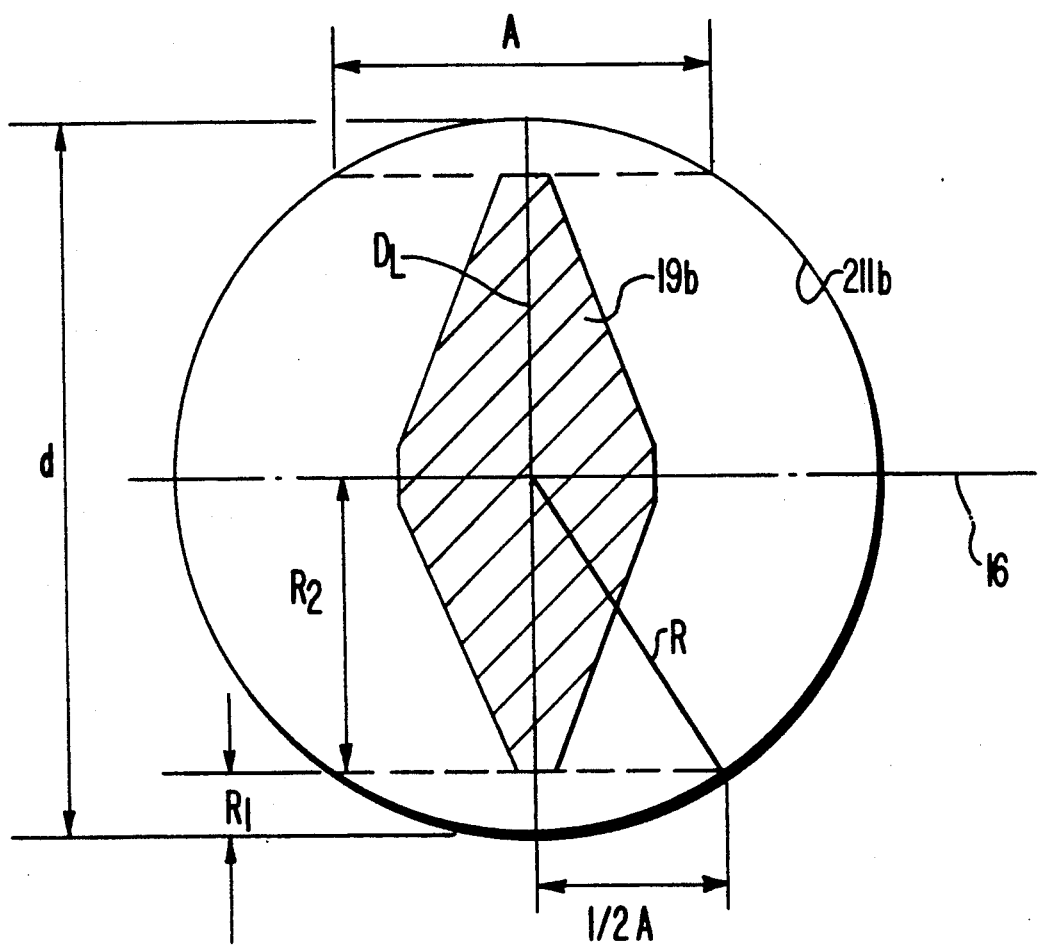
FIG. 6 shown various line segments related to the pin.

FIG. 6 more clearly sets forth the relationship between the amount truncated from each end of pin 19b and limited distance A defined above. FIG. 6 shows a cross section of pin 19b in relationship to hole 211b in the discoid portion. Radius R of hole 211b is shown as being equal to one-half of the diameter d of hole 211b. As discussed above, diameter d of hole 211b may be equal to or slightly larger than the length of longer diagonal $D_L$ of pin 19b. As can be seen in FIG. 6, the dashed line representing limited distance A intersects a radius of length R lying along longer diagonal $D_L$ forming two line segments $R_1$ and $R_2$. The length of line segment $R_1$ represents the amount truncated from one end of pin 19b. The length of $R_1$ can easily be calculated in terms of diameter d and limited distance A by applying the Pythagorean Theorem. As shown in FIG. 6, the line segments formed by the intersection of the dash line of limited distance A and radius R form a right triangle with sides R, $R_2$, and ½ A. The dimension we wish to describe, $R_1$, is equal to the difference between the radius R and the dimension $R_2$:

$$R = R_1 + R_2 \tag{1}$$

and $$R_2 = R - R_1$$

$$R_1 = R - R_2$$

The relationship between the three sides of the right triangle can be described using the Pythagorean Theorem:

$$(R_2)^2 + (\tfrac{1}{2} A)^2 = R^2 \tag{2}$$

By using the identities shown in equations (1), we can make a series of substitutions as follows:

$$(R - R_1)^2 + (\tfrac{1}{2} A)^2 = R^2 \tag{3}$$

$$(R - R_1)^2 = R^2 - (\tfrac{1}{2} A)^2 \tag{4}$$

$$R - R_1 = \sqrt{R^2 - (\tfrac{1}{2} A)^2} \tag{5}$$

-continued $$R_1 = R - \sqrt{R^2 - (\tfrac{1}{2} A)^2} \tag{6}$$

Equation (6) defines dimension $R_1$ in terms of radius R and limited distance A. Since we know that radius R is equal to or slightly larger than one-half of longer diagonal $D_L$, we can substitute the term $\tfrac{1}{2} D_L$ for the radius R into the expression in equation (6):

$$R_1 = \tfrac{1}{2}(D_L) - \sqrt{(\tfrac{1}{2} D_L)^2 - (\tfrac{1}{2} A)^2} \tag{7}$$

Which defines $R_1$ in terms of longer diagonal $D_L$ and limited distance A alone. We can further substitute to reduce this relationship:

$$R_1 = \tfrac{1}{2}[D_L - \sqrt{D_L^2 - A^2}] \tag{8}$$

Equation (8) thus defines the amount of truncation being a function of one-half of the difference between longer diagonal $D_L$ and the square root of the difference between longer diagonal $D_L$ squared and limited distance A squared.

Having described the invention in detail, it will be recognized that the foregoing is considered as illustrative only of the principles of the invention. Since numerous modifications and changes will readily occur to those skilled in the art, it is not desired to limit the invention to the exact construction shown and described. Accordingly, all suitable modifications and equivalents may be resorted to the extent they fall within the scope of the invention and claims appended hereto.

We claim:

1. A chuck for clamping a discoid portion of a workpiece, said chuck including a base, at least two fixed clamps secured on a front end surface of said base, a movable clamp adjacent to said front end surface and movable toward said two fixed clamps, and a pin secured to said front end surface of said base and adapted to fit within a hole formed in said discoid portion when said discoid portion is mounted on said chuck, the improvement comprising:

said pin having a generally rhombic transverse section with a long diagonal and a short diagonal, said pin being truncated by a predetermined amount at each end thereof along said long diagonal to allow the workpiece to move a limited distance relative to said pin along a line formed by said short diagonal.

2. The chuck of claim 1, wherein the limited distance is substantially equal to an initial clearance between said discoid portion and said chuck measured prior to clamping said workpiece on said chuck.

3. The chuck of claim 2, wherein said limited distance is a function of a variation between a diameter of said discoid portion and a diameter of an ideal discoid portion.

4. The chuck of claim 3, wherein said limited distance is equal to the sum of said initial clearance and one half of said variation.

5. The chuck of claim 4, wherein said predetermined amount is substantially equal to one half of the difference between said long diagonal and the square root of the difference between said long diagonal squared and said limited distance squared.

6. An apparatus for engaging a hole in and preventing the rotation of a discoid portion of a workpiece in a chuck while allowing the workpiece to move a limited distance, comprising:

a pin having a generally rhombic transverse section with a long diagonal and a short diagonal, said pin being truncated by a predetermined amount at each end thereof along said long diagonal to allow the workpiece to move the limited distance relative to said pin along a line formed by said short diagonal.

7. The apparatus of claim 6, wherein the limited distance is substantially equal to an initial clearance between said discoid portion and said chuck measured prior to clamping said workpiece on said chuck.

8. The apparatus of claim 7, wherein said limited distance is a function of a variation between a diameter of said discoid portion and a diameter of an ideal discoid portion.

9. The apparatus of claim 8, wherein said limited distance is equal to the sum of said initial clearance and one half of said variation.

10. The apparatus of claim 9, wherein said predetermined amount is substantially equal to one half of the difference between said long diagonal and the square root of the difference between said long diagonal squared and said limited distance squared.

* * * * *